United States Patent
Hallack et al.

(10) Patent No.: US 10,626,291 B2
(45) Date of Patent: Apr. 21, 2020

(54) CROSSLINKING OF IPMS ADDUCTS WITH AMINOSILANES

(71) Applicant: Evonik Operations GmbH, Essen (DE)

(72) Inventors: Markus Hallack, Schermbeck (DE); Andrea Biebel, Darmstadt (DE)

(73) Assignee: Evonik Operations, GmbH, Essen (DE)

( * ) Notice: Subject to any disclaimer, the term of this patent is extended or adjusted under 35 U.S.C. 154(b) by 0 days.

(21) Appl. No.: 14/787,696

(22) PCT Filed: Apr. 10, 2014

(86) PCT No.: PCT/EP2014/057239
§ 371 (c)(1),
(2) Date: Oct. 28, 2015

(87) PCT Pub. No.: WO2014/180623
PCT Pub. Date: Nov. 13, 2014

(65) Prior Publication Data
US 2016/0108280 A1  Apr. 21, 2016

(30) Foreign Application Priority Data

May 7, 2013 (DE) .................. 10 2013 208 356

(51) Int. Cl.
| | | |
|---|---|---|
| *C09D 175/04* | (2006.01) | |
| *C08G 18/10* | (2006.01) | |
| *C08G 18/12* | (2006.01) | |
| *C08G 18/24* | (2006.01) | |
| *C08G 18/80* | (2006.01) | |
| *C08G 18/28* | (2006.01) | |
| *C08G 18/71* | (2006.01) | |

(52) U.S. Cl.
CPC ............ *C09D 175/04* (2013.01); *C08G 18/10* (2013.01); *C08G 18/12* (2013.01); *C08G 18/24* (2013.01); *C08G 18/289* (2013.01); *C08G 18/718* (2013.01); *C08G 18/8009* (2013.01); *C08G 18/8064* (2013.01)

(58) Field of Classification Search
CPC ...... C09D 175/04; C08G 18/10; C08G 18/12; C08G 18/24; C08G 18/289; C08G 18/718; C08G 18/8009; C08G 18/8064
USPC ........................................................ 524/869
See application file for complete search history.

(56) References Cited

U.S. PATENT DOCUMENTS

| | | | |
|---|---|---|---|
| 7,569,653 B2 * | 8/2009 | Landon ................. | B82Y 30/00 528/65 |
| 2004/0087752 A1 | 5/2004 | Schindler et al. | |
| 2004/0132949 A1 * | 7/2004 | Roesler ............. | C08G 18/0885 528/28 |

FOREIGN PATENT DOCUMENTS

| | | | | |
|---|---|---|---|---|
| CN | 101410340 A * | 4/2009 | ............ | B82Y 30/00 |
| CN | 101535360 A | 9/2009 | | |
| DE | 10 2008 032 580 A1 | 1/2010 | | |
| DE | 102008032580 | 1/2010 | | |
| DE | 102008032580 A1 * | 1/2010 | ............ | C08G 65/20 |
| EP | 2 190 928 | 4/2018 | | |
| WO | 02/077072 A1 | 10/2002 | | |
| WO | WO 2010/004038 A1 | 1/2010 | | |
| WO | 2014/135353 A1 | 9/2014 | | |
| WO | 2014/139752 A1 | 9/2014 | | |

OTHER PUBLICATIONS

Translation of DE102008032580 (2010).*
Translation to DE 102008032580 A1 (Jan. 14, 2010).*
International Search Report dated Jun. 27, 2014 for PCT/EP2014/057239 filed on Apr. 10, 2014.

* cited by examiner

*Primary Examiner* — Kelechi C Egwim
(74) *Attorney, Agent, or Firm* — Grüneberg and Myers PLLC

(57) ABSTRACT

The present invention relates to coating materials at least comprising A) an adduct of isocyanatosilanes with hydroxy-functional compounds, B) a tin-containing compound and C) an aminosilane, to the use of the coating materials and also to the coatings obtained.

7 Claims, No Drawings

CROSSLINKING OF IPMS ADDUCTS WITH AMINOSILANES

The present invention relates to coating materials at least comprising A) an adduct of isocyanatosilanes with hydroxy-functional compounds, B) a tin-containing compound and C) an aminosilane, to the use of the coating materials and also to the coatings obtained.

For the permanently protective coating of heat-sensitive substrates, it is nowadays common to use 2-component coating materials which are able to cure even at ambient temperature. They consist of film-forming resins having functional groups and of crosslinkers, which react crosslinkingly with these functional groups even at ambient temperature. On account of their high reactivity, these crosslinkers frequently possess an intrinsic toxicological hazard potential for humans. There is therefore a desire to provide alternative coating systems which possess a comparably broad application spectrum and where at the same time the cured coatings are highly resistant to effects of chemicals or of weathering and also to mechanical stress. The technical benchmark employed comprises the long-known aliphatic 2-component (2K) PU systems.

An alternative 2K system is described by DE 10 2007 013 262. The 2K systems in question there, however, are systems which can be cured only at temperatures of 140° C.

WO 2010/004038 describes curable compositions comprising alkoxy- and/or acyloxysilane-terminated polymers. The compositions described therein however, are suitable only for producing adhesive bonds; they are unsuitable as pure coating materials.

EP 1 624 027 describes curable compositions comprising silane-containing polymers, metal carboxylates and/or carboxylic acids and heteroatom-containing silanes.

The systems known from the prior art have the disadvantage that the films that are obtained at room temperature exhibit functional robustness only after a number of days. Moreover, the systems known from the prior art are not very stable in storage.

It is an object of the present invention to provide a coating material which can be cured preferably even at temperatures in the range from 0° C. to 40° C. and which in the cured state leads to coatings having high mechanical resistance. The stated object is achieved by coating materials of the present invention.

A first subject of the present invention, accordingly, is a coating material at least comprising A) an adduct of isocyanatosilanes with hydroxy-functional compounds, B) a tin-containing compound and C) an aminosilane.

It has surprisingly emerged that coating materials comprising components A) to C) above lead to stable coatings even at 0° C. The coating materials of the invention are one-component systems, which are easy to apply. Because of the low-molecular components of the coating materials, they can be formulated and processed without additional organic solvents for subsequent use. It is therefore possible to realize a VOC content of below 100 g/l.

An essential subject of the present invention is the specific combination of A) an adduct of isocyanatosilanes with hydroxy-functional compounds, B) a tin-containing compound and C) an aminosilane.

Component A) of the coating materials of the invention comprises adducts of isocyanatosilanes with hydroxy-functional compounds. Adducts of this kind are known to the skilled person.

The isocyanatosilane preferably comprises a compound of the formula (I)

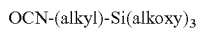

$$\text{OCN-(alkyl)-Si(alkoxy)}_3 \qquad (I)$$

in which alkyl denotes linear or branched alkylene chains having 1-4 carbon atoms, and in which alkoxy, simultaneously or independently of one another, denotes methoxy, ethoxy, propoxy or butoxy groups.

Suitable compounds of the formula (I) OCN-(alkyl)-Si(alkoxy)$_3$ are in principle all of the possible compounds described above. More preferably alkoxy is selected from methoxy and ethoxy groups.

Examples of suitable compounds of the formula (I) are isocyanatoalkylalkoxysilanes, selected more particularly from the group encompassing 3-isocyanatopropyltrimethoxysilane, 3-isocyanatopropyltriethoxysilane, 3-isocyanatopropyltriisopropoxysilane, 2-isocyanatoethyltrimethoxysilane, 2-isocyanatoethyltriethoxysilane, 2-isocyanatoethyltriisopropoxysilane, 4-isocyanatobutyltrimethoxysilane, 4-isocyanatobutyltriethoxysilane, 4-isocyanatobutyltriisopropoxysilanes, isocyanatomethyltrimethoxysilane, isocyanatomethyltriethoxysilane and/or isocyanatomethytriisopropoxysilane.

Particularly preferred for use as compound of the formula (I) are 3-isocyanatopropyltrialkoxysilanes, more particularly 3-isocyanatopropyltrimethoxysilane and/or 3-isocyanatopropyltriethoxysilane.

The aforementioned isocyanatosilanes take the form of a bound adduct with hydroxy-functional compounds.

Suitable such hydroxy-functional compounds include monohydric or polyhydric alcohols and also polyols.

Examples of suitable hydroxy-functional compounds are monoalcohols, diols, triols, polyols and also hydroxyl group-containing polymers.

In the case of the monoalcohols, these are, in particular, monofunctional branched or linear alcohols or mixtures thereof having 1 to 50 carbon atoms, preferably 1 to 22 carbon atoms, more particularly methanol, ethanol and propanol.

Particularly suitable diols are difunctional branched or linear alcohols or mixtures thereof having 1 to 50 carbon atoms, preferably 1 to 22 carbon atoms, more particularly ethylene glycol, propylene glycol and neopentyl glycol.

Particularly suitable glycol ethers are ethylene glycol monoethyl ether, ethylene glycol monopropyl ether, ethylene glycol monoisopropyl ether, ethylene glycol monobutyl ether, ethylene glycol monophenyl ether, ethylene glycol dimethyl ether, diethylene glycol monomethyl ether, diethylene glycol monoethyl ether, diethylene glycol monobutyl ether, diethylene glycol dimethyl ether, 1,1'-oxybis(2-triethylene glycol)monomethyl ether, triethylene glycol monobutyl ether, propylene glycol 1-methyl ether, propylene glycol 2-methyl ether, propylene glycol 1-ethyl ether, propylene glycol 1-butyl ether.

Particularly suitable triols are trifunctional branched or linear alcohols or mixtures thereof having 1 to 50 carbon atoms, preferably 1 to 22 carbon atoms, more particularly trimethylolpropane and glycerol.

Particularly suitable tetrols are tetrafunctional branched or linear alcohols or mixtures thereof having 1 to 50 carbon atoms, preferably 1 to 22 carbon atoms, more particularly pentaerythritol.

Suitable, moreover, additional polyols are hydroxyl group-containing polymers such as, for example, polyesters, polyethers, polyacrylates, polycarbonates, epoxy resins, cellulose derivatives, FEVE (Fluoroethylene-Alkyl Vinyl Ether) alkyds, and polyurethanes, having an OH number of 10 to 500 mg KOH/gram and a number-average molar mass of 250 to 6000 g/mole. Preference is given to using hydroxyl group-containing polyesters and/or polyacrylates having an OH number of 20 to 150 mg KOH/gram and a number-average molecular weight of 500 to 6000 g/mol.

The hydroxyl number (OHN) is determined in accordance with DIN 53240-2. This method involves reacting the sample with acetic anhydride in the presence of 4-dimethylaminopyridine as catalyst, with acetylation of the hydroxyl groups. This produces one molecule of acetic acid per hydroxyl group, whereas the subsequent hydrolysis of the excess acetic anhydride yields two molecules of acetic acid. The consumption of acetic acid is determined by titrimetry from the difference between the main value and a blank value to be carried out in parallel.

The number-average molecular weights are determined in accordance with DIN 55672-1 using gel permeation chromatography in tetrahydrofuran as eluent with polystyrene for calibration.

Furthermore, mixtures of the abovementioned hydroxyfunctional compounds may also be used.

The hydroxy-functional compounds are preferably hydroxyl group-containing polyesters and/or polyacrylates having an OH number of 20 to 150 mg KOH/gram and a number-average molecular weight of 500 to 6000 g/mol.

In the adducts A), preferably at least 30% of the OH groups of the hydroxyl-containing compounds, especially preferably all of the OH groups, have been converted by reaction with isocyanatosilanes.

The adducts A) are generally prepared solventlessly or using non-protic solvents, and the reaction may take place batchwise or continuously. The reaction can be carried out at room temperature, in other words at temperatures in the range of 20-25° C., although preference is given to using higher temperatures in the 30-150° C. range, more particularly in the range of 50-150° C. To accelerate the reaction it is possible with advantage to use catalysts which are known within urethane chemistry, such as Sn, Bi, Zn and other metal carboxylates, tertiary amines such as, for example, 1,4-diazabicyclo[2.2.2]octane (DABCO), triethylamine, etc. The reaction is carried out preferably in the absence of water.

The reaction of the isocyanatosilanes and of the hydroxy-functional compounds to form the adducts A) takes place here in particular such that the ratio of OH groups from the hydroxy-functional compounds to NCO groups from the isocyanatosilanes is from 0.8:1 to 1.2:1, preferably 0.9:1 to 1.1:1, with stoichiometric reaction being especially preferred. Accordingly, with particular preference, there is complete conversion of all OH groups of the hydroxy-functional compounds with NCO groups of the isocyanatosilanes, especially those of the compounds of the formula (I).

In the stated conversion, the NCO groups of the isocyanatosilanes react with the OH groups of the hydroxy-functional compounds to form NH—CO—O groups, which link the stated compounds with one another.

The adducts A) are liquid in particular at temperatures above 0° C. They are non-crystallizing compounds of low molecular mass. Depending on the selected stoichiometry of the two reactants, the reaction product may still contain free hydroxyl or isocyanate groups.

In one preferred embodiment, the adducts A) are substantially free from hydroxyl or isocyanate groups. In solvent-free form, the adducts are of low or medium viscosity and are liquid at 0° C. For greater ease of handling, however, the products may also have had solvents added to them, which, like alcohols, may also be protic. The solids contents of such preparations are preferably >80 wt %, the maximum viscosity being preferably 500 mPas (DIN EN/ISO 3219 23° C.).

The amount of component A) in the coating material of the invention is preferably 10 to 90 wt %, especially preferably 10 to 80 wt %, based in each case on the coating material.

Component B) of the coating materials of the invention comprises a tin-containing compound, preferably an organotin compound.

With particular preference this is at least one organic tin compound of the formula (II)

$$R^1_{4-a}SnX_a \quad (II)$$

where a is 1, 2 or 3, $R^1$ independently is selected from the group consisting of linear or branched, optionally substituted C1-C30 alkyl groups, C5-C14 cycloalkyl groups or C6-C14 aryl groups, triorganylsilyl groups and also C1-C30 diorganylalkoxysilyl groups, and X is selected from the group consisting of halogen, $-OR^2$, $-OC(O)R^3$, $-OH$, $-SR^4$, $-NR^5_2$, $-NHR^6$, $-OSiR^7_3$, $-OSi(OR^8)_3$, in which the substituents $R^2$ to $R^8$ in each case independently of one another are selected from optionally substituted C1-C8 alkyl, C6-C14 aryl and/or C2-C8 alkenyl groups.

The linear or branched, optionally substituted, C1-C30 alkyl groups mentioned in the definition of the above-stated organic tin compounds include those having 1 to 30 carbon atoms, such as, for example, methyl, ethyl, chloroethyl, n-propyl, isopropyl, n-butyl, isobutyl, pentyl, hexyl, heptyl, ethylhexyl, octyl, decyl, undecyl, dodecyl, tridecyl, etc. Butyl, hexyl or octyl is preferred.

The C5-C14 cycloalkyl groups mentioned in the definition of the above-stated organic tin compounds include monocyclic or polycyclic alkyl groups, such as, for example, cyclopentyl, cyclohexyl, cyclohexylethyl, cyclooctyl, decalinyl, hydrindanyl, bicyclo[2.2.1]heptanyl, bicyclo[2.2.2]octanyl, bicyclo[4.2.3]nonyl etc.

C6-C14 aryl groups comprise, for example, phenyl and naphthenyl or fluorenyl groups.

Preferred examples of suitable tin-containing compounds of component B) are alkyltin chlorides and mixtures thereof, for example di-n-butyltin dichloride and di-n-octyltin dichloride, or alkyltin oxides and mixtures thereof, for example di-n-butyltin oxide and di-n-octyltin oxide, dibutyltin carboxylates, for example di-n-butyltin diacetate, di-n-butyltin dilaurate, di-n-butyltin maleate, di-n-butyltin bis-2-ethylhexanoate and also di-n-butyltin dineodecanoate, dioctyltin carboxylates, such as di-n-octyltin diacetate, di-n-octyltin dilaurate, di-n-octyltin maleate, di-n-octyltin bis-2-ethylhexanoate or di-n-octyltin dineodecanoate, and also dialkyltin complexes, for example di-n-butyltin diacetylacetonate. Tin compounds which can be used with particular advantage in the mixtures of the invention are generally those which dissolve, immediately or after heating, in the coating materials of the invention.

Especially preferred compounds of component B) are ketonates.

The amount of the tin-containing compound B) in the coating material of the invention is preferably 0.01 to 1.0 wt %, especially preferably 0.1 to 1 wt %, based in each case on the coating material.

Component C) of the coating materials of the invention comprises an aminosilane, and more particularly the aminosilane comprises aminosilanes or aminoalkylsilanes of the general formula (III)

$$A_mSiY_n \quad (III),$$

in which

A is a substituted or unsubstituted aminoalkyl group, a substituted or unsubstituted diaminodialkyl group or substituted or unsubstituted triaminotrialkyl group, the groups Y are identical or different, and Y is OH, ONa, OK, OR', OCOR', OSiR'$_3$, Cl, Br, I or NR'$_2$, m is 1 or 2 and n is 1, 2 or 3, with the proviso that m+n=4, and the groups R' independently are hydrogen, linear or branched alkyl, cycloalkyl, alkenyl, cycloalkenyl, alkynyl, cycloalkynyl, aryl or heteroaryl groups, have in each case 1 to 18 C atoms and may in each case optionally be substituted.

Preferably m is 1 and n is 3. With further preference Y is selected from OH or OR', with OR' being particularly preferred. In that case R' is selected in particular from methyl or ethyl groups, with methyl groups being especially preferred.

Aminosilanes or aminoalkylsilanes of these kinds are—for example, though not exclusively—3-aminopropyltrimethoxysilane, 3-aminopropyltriethoxysilane, 2-aminoethyl-3-aminopropyltrimethoxysilane, 3-aminopropyl(diethoxymethoxysilane), 3-aminopropyl(tripropoxysilane), 3-aminopropyl(dipropoxymethoxysilane), 3-aminopropyl(tridodecanoxysilane), 3-aminopropyl(tritetradecanoxysilane), 3-aminopropyl(trihexadecanoxysilane), 3-aminopropyl(trioctadecanoxysilane), 3-aminopropyl(didodecanoxy)tetradecanoxysilane, 3-aminopropyl(dodecanoxy)tetradecanoxy(hexadecanoxy)silane, 3-aminopropyl(dimethoxymethylsilane), 3-aminopropyl(methoxydimethylsilane), 3-aminopropyl(hydroxydimethylsilane), 3-aminopropyl(diethoxymethylsilane), 3-aminopropyl(ethoxydimethylsilane), 3-aminopropyl(dipropoxymethylsilane), 3-aminopropyl(propoxydimethylsilane), 3-aminopropyl(diisopropoxymethylsilane), 3-aminopropyl(isopropoxydimethylsilane), 3-aminopropyl(dibutoxymethylsilane), 3-aminopropyl(butoxydimethylsilane), 3-aminopropyl(disiobutoxymethylsilane), 3-aminopropyl(isobutoxydimethylsilane), 3-aminopropyl(didodecanoxymethylsilane), 3-aminopropyl(dodecanoxydimethylsilane), 3-aminopropyl(ditetradecanoxymethylsilane), 3-aminopropyl(tetradecanoxydimethylsilane), 2-aminoethyl(trimethoxysilane), 2-aminoethyl(triethoxysilane), 2-aminoethyl(diethoxymethoxysilane), 2-aminoethyl(tripropoxysilane), 2-aminoethyl(dipropoxymethoxysilane), 2-aminoethyl(tridodecanoxysilane), 2-aminoethyl(tritetradecanoxysilane), 2-aminoethyl(trihexadecanoxysilane), 2-aminoethyl(trioctadecanoxysilane), 2-aminoethyl(didodecanoxy)tetradecanoxysilane, 2-aminoethyl(dodecanoxy)tetradecanoxy(hexadecanoxy)silane, 2-aminoethyl(dimethoxymethylsilane), 2-aminoethyl(methoxydimethylsilane), 2-aminoethyl(diethoxymethylsilane), 2-aminoethyl(ethoxydimethylsilane), 1-aminomethyl(trimethoxysilane), 1-aminomethyl(triethoxysilane), 1-aminomethyl(diethoxymethoxysilane), 1-aminomethyl(dipropoxymethoxysilane), 1-aminomethyl(tripropoxysilane), 1-aminomethyl(trimethoxysilane), 1-aminomethyl(dimethoxymethylsilane), 1-aminomethyl(methoxydimethylsilane), 1-aminomethyl(diethoxymethylsilane), 1-aminomethyl(ethoxydimethylsilane), 3-aminobutyl(trimethoxysilane), 3-aminobutyl(triethoxysilane), 3-aminobutyl(diethoxymethoxysilane), 3-aminobutyl(tripropoxysilane), 3-aminobutyl(dipropoxymethoxysilane), 3-aminobutyl(dimethoxymethylsilane), 3-aminobutyl(diethoxymethylsilane), 3-aminobutyl(dimethylmethoxysilane), 3-aminobutyl (dimethylethoxysilane), 3-aminobutyl(tridodecanoxysilane), 3-aminobutyl(tritetradecanoxysilane), 3-aminobutyl(trihexadecanoxysilane), 3-aminobutyl(didodecanoxy)tetradecanoxysilane, 3-aminobutyl(dodecanoxy)tetradecanoxy(hexadecanoxy)silane, 3-amino-2-methylpropyl(trimethoxysilane), 3-amino-2-methylpropyl(triethoxysilane), 3-amino-2-methylpropyl(diethoxymethoxysilane), 3-amino-2-methylpropyl(tripropoxysilane), 3-amino-2-methylpropyl(dipropoxymethoxysilane), 3-amino-2-methylpropyl(tridodecanoxysilane), 3-amino-2-methylpropyl(tritetradecanoxysilane), 3-amino-2-methylpropyl(trihexadecanoxysilane), 3-amino-2-methylpropyl(trioctadecanoxysilane), 3-amino-2-methylpropyl(didodecanoxy)tetradecanoxysilane, 3-amino-2-methylpropyl(dodecanoxy)tetradecanoxy(hexadecanoxy)silane, 3-amino-2-methylpropyl(dimethoxymethylsilane), 3-amino-2-methylpropyl(methoxydimethylsilane), 3-mercapto-2-methylpropyl(diethoxymethylsilane), 3-mercapto-2-methylpropyl(ethoxydimethylsilane), 3-mercapto-2-methylpropyl(dipropoxymethylsilane), 3-amino-2-methylpropyl(propoxydimethylsilane), 3-amino-2-methylpropyl(diisopropoxymethylsilane), 3-amino-2-methylpropyl(isopropoxydimethylsilane), 3-amino-2-methylpropyl(dibutoxymethylsilane), 3-amino-2-methylpropyl(butoxydimethylsilane), 3-amino-2-methylpropyl(diisobutoxymethylsilane), 3-amino-2-methylpropyl(isobutoxydimethylsilane), 3-amino-2-methylpropyl(didodecanoxymethylsilane), 3-amino-2-methylpropyl(dodecanoxydimethylsilane), 3-amino-2-methylpropyl(ditetradecanoxymethylsilane) or 3-amino-2-methylpropyl(tetradecanoxydimethylsilane), triamino-functional propyltrimethoxysilane, bis(3-trimethoxysilylpropyl)amine, bis(3-triethoxysilylpropyl)amine, N-benzyl-N-(2-aminoethyl)-3-aminopropyltrimethoxysilane hydrochloride, N-benzyl-N-(2-aminoethyl)-3-aminopropyltrimethoxysilane hydroacetate, N-(n-butyl)-3-aminopropyltrimethoxysilane, 3-aminopropylmethyldiethoxysilane, N-vinylbenzyl-N-(2-aminoethyl)-3-aminopropylpolysiloxane and N-(2-aminoethyl)-3-aminopropylmethyldimethoxysilane.

Preferred aminosilanes or aminoalkylsilanes are substituted or unsubstituted aminosilane compounds, especially 3-aminopropyltrimethoxysilane, 3-aminopropyltriethoxysilane, 3-aminopropylmethyldiethoxysilane, N-(2-aminoethyl)-3-aminopropyltrimethoxysilane, 2-aminopropyl-3-aminopropyltrimethoxysilane, 2-aminopropyl-3-aminopropyltriethoxysilane, 2-aminoethyl-2-aminoethyl-3-aminopropyltrimethoxysilane, 2-aminoethyl-2-aminoethyl-3-aminopropyltriethoxysilane and N-(n-butyl)-3-aminopropyltrimethoxysilane.

Particularly preferred for use are 3-aminopropyltrimethoxysilane (DYNASYLAN® AMMO), 3-aminopropyltriethoxysilane (DYNASYLAN® AMEO), 3-aminopropylmethyldiethoxysilane (DYNASYLAN® 1505), N-(n-butyl)-3-aminopropyltrimethoxysilane (DYNASYLAN® 1189) and N-(2-aminoethyl)-3-aminopropyltrimethoxysilane (DYNASYLAN® DAMO), $(H_3CO)_3Si(CH_2)_3NH(CH_2)_3Si(OCH_3)_3$ (Bis-AMMO), $(H_5C_2O)_3Si(CH_2)_3NH(CH_2)_3Si(OC_2H_5)_3$ (Bis-AMEO), $(H_3CO)_3Si(CH_2)_3NH(CH_2)_2NH(CH_2)_2NH(CH_2)_3Si(OCH_3)_3$ (Bis-DAMO), in each case from Evonik Industries AG, as aminosilanes C).

The amount of component C) in the coating material of the invention is preferably 5 to 30 wt %, especially preferably 10 to 20 wt %, based in each case on the coating material.

The coating material of the invention may further optionally comprise one or more binder components. Suitable in principle as binder components are all kinds of binders known to the skilled person, including, for example, binders which are thermoplastic, in other words not crosslinkable, which customarily have an average molecular weight >10 000 g/mol. Used with preference, however, are binders which possess reactive functional groups having acidic hydrogen atoms. Suitable binders of the type stated have for example at least one, but preferably two or more, hydroxyl group(s). Further suitable functional groups of the binder are trialkoxysilane functionalities, for example.

Binders with functional groups that are used are preferably hydroxyl group-containing polymers, more particularly hydroxyl group-containing polyesters, polyethers, polyacrylates, polycarbonates and polyurethanes having an OH number of 20 to 500 mg KOH/g and an average molar mass of 250 to 6000 g/mole. Particular preference in the context of the present invention is given to using hydroxyl group containing polyesters or polyacrylates having an OH number of 20 to 150 mg KOH/g and an average molecular weight of 500 to 6000 g/mol as binder components.

Hydroxyl group containing (meth)acrylic copolymers used may be resins having a monomer composition of the kind described, for example, in WO 93/15849 (page 8, line 25 to page 10, line 5), or else in DE 195 29124. In that case the acid number of the (meth)acrylic copolymer, to be set through proportional use of (meth)acrylic acid as monomer, ought to be 0-30, preferably 3-15 mg KOH/g. The number-average molar weight (determined by gel permeation chromatography against a polystyrene standard) of the (meth) acrylic copolymer is preferably 2000-20 000 g/mol, the glass transition temperature being preferably −40° C. to +60° C. The hydroxyl content of the (meth)acrylic copolymers for use in accordance with the invention, to be set through proportional use of hydroxyalkyl (meth)acrylates, is preferably 70-250 mg KOH/g, more preferably 90-190 mg KOH/g.

Polyester polyols suitable in accordance with the invention are resins with a monomer composition made up of dicarboxylic and polycarboxylic acids and diols and polyols, as are described in, for example, Stoye/Freitag, Lackharze, C. Hanser Verlag, 1996, page 49 or else in WO 93/15849. Polyester polyols used may also be polyaddition products of caprolactone with low molecular mass diols and triols, of the kind available, for example, under the name CAPA® (Perstorp). The arithmetically determined number-average molar weight is preferably 500-5000 g/mol, more preferably 800-3000 g/mol, the average functionality is preferably 2.0-4.0, more preferably 2.0-3.5.

As urethane- and ester-group-containing polyols for use in accordance with the invention, those employed include in principle those of the kind as described in EP 140 186. Preference is given to using urethane- and ester-group-containing polyols prepared using HDI, IPDI, trimethylhexamethylene diisocyanate (TMDI) or ($H_{12}$-MDI). The number-average molar weight is preferably 500-2000 g/mol; the average functionality lies more particularly in the range of 2.0-3.5.

Of course, mixtures of the above-described binders may also be used. Preferred binders are hydroxyl group-containing polyesters and polyacrylates, alone or in mixtures.

The proportion of any additional binders in the coating material of the invention is especially 5-60 wt %, based on the coating material, more particularly 10 to 40 wt %.

The coating material of the invention may further comprise auxiliaries and/or adjuvants that are known within coatings technology, such as stabilizers, including light stabilizers, catalysts, fillers, pigments, flow control agents or rheological assistants, such as "sag control agents", for example, microgels or pyrogenic silicon dioxide, in typical concentrations. If necessary, organic or inorganic colour and/or effect pigments that are customary within coatings technology may also be incorporated in the coating material of the invention.

In the case of pigment-free coating materials, the auxiliaries and/or adjuvants are included in the coating material of the invention preferably in amounts of 0.01 up to 90 wt %, more particularly 0.1 to 20 wt %, based on the coating material. In the case of pigment- and/or filler-containing coating materials, the amount of auxiliaries and/or adjuvants may be 0.01 to 99 wt %, more particularly 0.1 to 90 wt %, based on the coating material.

The coating material of the invention may further comprise organic solvents. Suitable solvents are, for example, ketones, esters, alcohols or aromatics.

The solvents are included in the coating material of the invention preferably in amounts of 1 up to 50 wt %, more particularly 5 to 75 wt %, based on the coating material. The amount of the solvents is guided by the application viscosity to be set for the coating material.

The sum total of all fractions of components A) to C) and also of the additionally possible binders, auxiliaries and adjuvants, and solvents, makes 100 wt %.

The coating materials of the invention are produced by mixing of the components described above. The mixing may be accomplished in mixers known to the skilled person, examples being stirring vessels, dissolvers, bead mills, roll mills, etc., or else continuously by means of static mixers.

The coating materials of the invention may be used in particular for the coating of wood, plastic, glass and metal. In this way, coatings are obtained that crosslink even at temperatures below 100° C.

Accordingly, a further subject of the invention is the use of coating materials composed of A) an adduct of isocyanatosilanes with hydroxy-functional compounds, B) a tin-containing compound and C) an aminosilane, the coating materials composed of components A) to C) being curable in particular at temperatures of 0° C. to 80° C., for the coating of wood, plastic, glass or metal.

The coatings obtained on the basis of the above-stated coating materials are characterized by a high level of resistance towards mechanical stress. In addition, they exhibit very good resistance to chemicals, extremely good weathering resistance, and a very good balance between hardness and flexibility.

Coatings comprising the coating materials of the invention are a further subject of the present invention.

Even in the absence of further information it is assumed that a person skilled in the art can make very extensive use of the above description. The preferred embodiments and examples are therefore to be interpreted merely as descriptive disclosure, and certainly not as disclosure that is in any way limiting.

The present invention is explained in more detail below with reference to examples. Alternative embodiments of the present invention are obtainable analogously.

EXAMPLES

Preparation protocol for the coating materials:
The individual compounds, according to formula, are weighed out in succession into a 250 mL glass bottle and stirred thoroughly using a laboratory stirrer until the resulting solution is homogeneous and thoroughly mixed.

Production protocol for the coatings:

The individual coating materials are applied to a glass plate with a wet film thickness of 100 μm, using a four-way film-drawing frame.

The coating films spend 24 hours in a controlled-climate chamber at 23° C. and a relative humidity of 50%. After an interval of 1 hour, 3 hours, 6 hours and 12 hours and after one day, the König pendulum hardnesses of the films produced are ascertained, in order to determine the drying behaviour of the individual samples. The results of the coatings obtained are set out in Table 1. The hardness of the coating material is determined by determination of the pendulum hardness:

The basis for the pendulum hardness is that the greater the damping effect of the substrate and the absorption of swing energy, the more quickly the amplitude of swaying of the self-supporting pendulum is reduced.

The sample plate (coating film) is placed on the reciprocating platen. With the lever arm, which can be operated from the outside, the reciprocating platen is subsequently moved up to the pendulum. The pendulum is deflected to the 6° scale position, fixed with the wire trigger, and then let go. A determination is made of the number of swings needed to cause the pendulum swing to subside from 6° to 3° relative to the vertical. The measurement is conducted at 2 different positions within the sample. Multiplying the swings by a factor of 1.4 gives the calculated König pendulum damping in seconds.

TABLE 1

|  | Example | | | | | |
| --- | --- | --- | --- | --- | --- | --- |
|  | A | B | C | D | E | F |
| Vestanat M 95 (1) | 100 | 90 | 89.7 | 50 | 45 | 44.9 |
| Dynasylan AMMO (2) |  | 10 | 10 |  | 5 | 5 |
| TIB Kat 226 (3) |  |  | 0.3 |  |  | 0.15 |
| Desmophen A 450 BA; 25% (4) |  |  |  | 50 | 50 | 50 |

All figures in weight percent

| Determination of drying | Pendulum hardness | | | | | |
| --- | --- | --- | --- | --- | --- | --- |
| 1 h | liquid | 19.6/29.4 | 44.8/44.8 | tacky | 9.8/9.8 | 22.4/22.4 |
| 3 h | liquid | 32.2/40.6 | 46.2/47.6 | tacky | 21.0/21.0 | 82.6/81.2 |
| 6 h | liquid | 33.6/35.0 | 85.4/84.0 | tacky | 39.2/37.8 | 121.8/121.8 |
| 12 h | liquid | 43.4/42.0 | 112.0/113.4 | tacky | 84.0/81.2 | 134.4/133.0 |
| 1 d | liquid | 81.2/84.0 | 134.4/140.0 | tacky | 141.4/138.6 | 155.4/152.6 |

(1) Adduct of isocyanatopropyltrimethoxysilane and 1,9-nonanediol (ratio of isocyanatopropyltrimethoxysilane to 1,9-nonanediol is 2:1)
(2) 3-Aminopropyltrimethoxysilane from Evonik Industries AG
(3) Di-n-butyltin dineodecanoate, TIB Chemicals AG
(4) Hydroxyl group-containing polyacrylate from Viverso Result The results show that a combination of Vestanat M 95, Dynasylan AMMO and TIB Kat 226, ratio: 90:10:0.3, sample C, as coating material exhibits good drying behaviour at room temperature. With this combination, good drying properties are also apparent in conjunction with a further dissolved reactive acrylic resin, Desmophen A 450, sample F.

The coating films of Vestanat M 95, sample A, and also the mixture of Vestanat M 95 and Desmophen A 450 BA, sample D, still exhibit no initial drying after 24 hours. The films are tacky. As a result of the addition of Dynasylan AMMO, sample B and sample E, an initial drying is recorded after 1 hour, with through-drying in the subsequent course of drying. Nevertheless, the two samples do not attain the good drying behaviour of the C and F samples. The use of the catalyst TIB Kat. 226 further significantly improves and accelerates drying.

The invention claimed is:

1. A coating material, comprising:
   A) from 10-90 wt. % based on the total weight of the coating material of an adduct of at least one isocyanatosilane with at least one hydroxy-functional compound;
   B) a tin-containing compound of the formula

wherein:
   a is 1, 2, or 3,
   $R^1$ independently is selected from the group consisting of a linear or branched optionally substituted C1-C30 alkyl group, C5-C14 cycloalkyl group, C6-C14 aryl group, triorganylsilyl group, and C1-C30 diorganylalkoxysilyl group, and
   X is selected from the group consisting of halogen, —$OR^2$, —$OC(O)R^3$, —OH, —$SR^4$, —$NR^5_2$, —$NHR^6$, —$OSiR^7_3$, —$OSi(OR^8)_3$, in which the substituents $R^2$ to $R^8$ in each case independently of one another are selected from an optionally substituted C1-C8 alkyl, C6-C14 aryl and/or C2-C8 alkenyl group; and
   C) from 10 to 20 wt. %, based on the total weight of the coating material, of an aminosilane
   wherein said at least one hydroxyl-functional compound is at least one compound selected from the group consisting of a diol having 1 to 22 carbon atoms, a triol having 1 to 22 carbon atoms and a tetrol having 1 to 22 carbon atoms; and
   wherein said at least one hydroxyl-functional compound and said adduct are not a polyether.

2. The coating material of claim 1, wherein the isocyanatosilane is a compound of the formula (I):

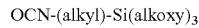   (I), wherein
- alkyl represents a linear or branched alkylene chain having 1-4 carbon atoms; and
- alkoxy independently represents a methoxy, ethoxy, propoxy, or butoxy group.

3. The coating material of claim 1, wherein a ratio of OH groups from the at least one hydroxy-functional compound to NCO groups from the at least one isocyanatosilane is from 0.8:1 to 1.2:1.

4. The coating material of claim 1, wherein the tin-containing compound is at least one selected from the group consisting of di-n-butyltin dichloride, di-n-octyltin dichloride, di-n-butyltin oxide, di-n-octyltin oxide, di-n-butyltin diacetate, di-n-butyltin dilaurate, di-n-butyltin maleate, di-n-butyltin bis-2-ethylhexanoate, di-n-butyltin dineodecanoate, di-n-octyltin diacetate, di-n-octyltin dilaurate, di-n-octyltin maleate, di-n-octyltin bis-2-ethylhexanoate, di-n-octyltin dineodecanoate, and di-n-butyltin diacetylacetonate.

5. The coating material of claim 1, wherein the aminosilane comprises aminosilane or aminoalkylsilane of the formula (III):

$$A_m SiY_n \qquad (III),$$

wherein:
- A is a substituted or unsubstituted aminoalkyl group, a substituted or unsubstituted diaminodialkyl group or substituted or unsubstituted triaminotrialkyl group,
- Y each independently represents OH, ONa, OK, OR', OCOR', OSiR'$_3$, Cl, Br, I, or NR'$_2$,
- m is 1 or 2,
- n is 1, 2, or 3, with the proviso that m+n=4, and
- R' each independently represents hydrogen, a linear or branched alkyl, cycloalkyl, alkenyl, cycloalkenyl, alkynyl, cycloalkynyl, aryl, or heteroaryl group, having in each case 1 to 18 C atoms and may in each case optionally be substituted.

6. The coating material of claim 1, further comprising a binder component, auxiliary, adjuvant, and/or solvent.

7. The coating material of claim 1, wherein the ratio of OH groups from the at least one hydroxy-functional compound to NCO groups from the at least one isocyanatosilane is from 0.9:1 to 1.1:1.

* * * * *